United States Patent
Cicognani et al.

(10) Patent No.: US 11,383,470 B2
(45) Date of Patent: Jul. 12, 2022

(54) METHOD AND APPARATUS FOR CONTROLLING THE LAYING DOWN OF COMPONENTS OF TYRES ON FORMING DRUMS

(71) Applicant: PIRELLI TYRE S.P.A., Milan (IT)

(72) Inventors: Fabio Cicognani, Milan (IT); Roberto Zavaglio, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 1019 days.

(21) Appl. No.: 15/029,451

(22) PCT Filed: Oct. 15, 2014

(86) PCT No.: PCT/IB2014/065339
§ 371 (c)(1),
(2) Date: Apr. 14, 2016

(87) PCT Pub. No.: WO2015/056192
PCT Pub. Date: Apr. 23, 2015

(65) Prior Publication Data
US 2016/0263849 A1 Sep. 15, 2016

(30) Foreign Application Priority Data
Oct. 15, 2013 (IT) .......................... MI2013A001698

(51) Int. Cl.
*B29D 30/30* (2006.01)
*B29D 30/44* (2006.01)
(Continued)

(52) U.S. Cl.
CPC ............ *B29D 30/30* (2013.01); *B29C 66/961* (2013.01); *B29C 66/963* (2013.01); *B29D 30/42* (2013.01);
(Continued)

(58) Field of Classification Search
CPC .............. B29D 30/42; B29D 2030/421; B29D 2030/422; B29D 2030/423;
(Continued)

(56) References Cited

U.S. PATENT DOCUMENTS 5,546,330 A * 8/1996 Sergei ................ B29D 30/3007
156/134
7,135,080 B2 11/2006 Shimizu et al.
(Continued)

FOREIGN PATENT DOCUMENTS

| CN | 102233685 | 11/2011 |
|---|---|---|
| DE | 41 08 515 | 9/1991 |

(Continued)

OTHER PUBLICATIONS

Machine generated English language translation of JP 2011-213024 (original document dated Oct. 2011) (Year: 2011).*

(Continued)

*Primary Examiner* — Geoffrey L Knable
(74) *Attorney, Agent, or Firm* — Finnegan, Henderson, Farabow, Garrett & Dunner, L.L.P.

(57) ABSTRACT

A method for controlling the laying down of components of tyres on forming drums, includes: sending a first electromagnetic radiation on a first laying down structure including a forming drum and a first component of a tyre laid down on the forming drum; detecting at least a first corresponding reflected radiation, determining as a function of the first reflected radiation a first parameter representative of a first main length of the first component; comparing the first parameter with one or more pre-stored reference values; generating a first correction signal as a function of the comparison; and sending the first correction signal to at least one preparation station adapted to prepare the first component to regulate the preparation of further components. An (Continued)

apparatus for controlling the laying down of components of tyres on forming drums is also described.

14 Claims, 6 Drawing Sheets

(51) Int. Cl.
    *G01B 11/02*   (2006.01)
    *B29C 65/00*   (2006.01)
    *B29D 30/42*   (2006.01)
(52) U.S. Cl.
    CPC .............. *B29D 30/44* (2013.01); *G01B 11/02* (2013.01); *B29D 2030/4425* (2013.01); *B29D 2030/4437* (2013.01)
(58) Field of Classification Search
    CPC ........ B29D 2030/427; B29D 2030/428; B29D 2030/4437; B29D 2030/546; B29D 30/30; B29D 30/3007; B29D 2030/0066; B29C 53/8041; B29C 66/961; B29C 66/963
    See application file for complete search history.

(56) References Cited

U.S. PATENT DOCUMENTS

| | | | |
|---|---|---|---|
| 9,121,693 B2 | 9/2015 | Iwayama | |
| 2001/0008162 A1* | 7/2001 | Shimizu | B29D 30/3007 156/117 |
| 2003/0170336 A1* | 9/2003 | Caretta | B29D 30/0016 425/340 |
| 2004/0020584 A1 | 2/2004 | Shimizu et al. | |
| 2007/0113948 A1 | 5/2007 | Shimizu et al. | |
| 2010/0043940 A1* | 2/2010 | Ogawa | B29D 30/60 156/64 |
| 2013/0103181 A1 | 4/2013 | Ballabio et al. | |
| 2013/0169974 A1 | 7/2013 | Iwayama | |

FOREIGN PATENT DOCUMENTS

| | | | | |
|---|---|---|---|---|
| DE | 100 36 010 | | 2/2002 | |
| EA | 9923 | | 4/2008 | |
| EP | 2 613 122 | | 7/2013 | |
| JP | 01197609 A | * | 8/1989 | |
| JP | 05087525 | | 4/1993 | |
| JP | 06-166121 A | * | 6/1994 | |
| JP | 07232382 | | 9/1995 | |
| JP | 09207240 | | 8/1997 | |
| JP | 2004-009339 A | * | 1/2004 | |
| JP | 2011-213024 | * | 10/2011 | ............. B29D 30/30 |
| KR | 10-2002-0078731 | | 10/2002 | |
| KR | 2010/0037938 | | 4/2010 | |
| KR | 10-1022879 | | 3/2011 | |
| KR | 10-2013-0092997 | | 8/2013 | |
| RU | 2174671 | | 10/2001 | |
| WO | WO 2013/011396 | | 1/2013 | |

OTHER PUBLICATIONS

Notice of Reasons for Rejection dated Aug. 8, 2018, from the Japanese Patent Office, in counterpart Japanese Application No. 2016-519758.

Decision to Grant dated Jun. 13, 2018, from the Federal Service for Intellectual Property, in counterpart Russian Application No. 2016118553.

English-language International Search Report from the Japanese Patent Office for International Application No. PCT/IB2014/065339, dated Mar. 3, 2015.

Notice of Allowance dated Aug. 21, 2020 from Korean Intellectual Property Office, in counterpart Korean Application No. 10-2016-7010251.

* cited by examiner

Liner – Short junction (2°)

Liner – Head to head junction

Liner – Long junction

METHOD AND APPARATUS FOR CONTROLLING THE LAYING DOWN OF COMPONENTS OF TYRES ON FORMING DRUMS

CROSS REFERENCE TO RELATED APPLICATIONS

This application is a national phase application based on PCT/IB2014/065339, filed Oct. 15, 2014, which claims the priority of Italian Patent Application No. MI2013A001698, filed Oct. 15, 2013, the content of both applications being incorporated herein by reference.

BACKGROUND OF THE INVENTION

Field of the Invention

The present invention refers to a method for controlling the laying down of components of tyres on forming drums.

The present invention refers also to an apparatus for controlling the laying down of components of tyres on forming drums.

Description of the Related Art

A tyre for vehicle wheels generally comprises a carcass structure comprising at least a carcass ply having respectively opposite terminal edges engaged to respective anchoring annular structures, generally called "bead cores", placed in the areas usually identified as "beads", having an internal diameter substantially corresponding to a so-called "fitting diameter" of the tyre on a respective mounting rim. The tyre also comprises a crown structure comprising at least one belt layers, placed in a radially external position in relation to the carcass ply, and one tread band radially external in relation to the belt layer. A so-called "underlayer" can be interposed between the tread band and the belt layer/s, said underlayer being made of an elastomeric material having properties adapted to ensure a stable coupling of the belt layer/s with the tread band itself. On the side surfaces of the carcass structure, each extending from one of the side edges of the tread band up to the respective anchoring annular structure to the beads, respective sidewalls made of elastomeric material are applied. In the tyres of "tubeless" type, the carcass ply is internally covered by a layer of a preferably butyl-based elastomeric material, usually called "liner" having optimal characteristics of air tightness and extending from one bead to the other.

The term "elastomeric material" intends to indicate a composition comprising at least one elastomeric polymer and at least one reinforcing filler. Preferably such composition comprises also additives such as a cross-linking agent and/or a plasticizer. Thanks to the presence of the cross-linking agent, such material can be cross-linked by heating, so as to form the final article of manufacture.

The "component" of the tyre has to be intended as any functional component of the tyre assembled in the form of a cut-to-size strip (for example: under-liner, liner, carcass ply/ies, belt layer/s, underlayer, tread band, etc.).

The "laying structure" has to be intended as a set comprising a forming drum and a component laid down thereon.

The "main length" of a component laid down on a forming drum has to be intended as the circumferential distance between the first end laid down (also called "head edge") and the second end laid down (also called "tail edge") of said component.

In case the two opposite edges of the component laid down overlap, such main length is the circumferential length of the portion of said component laid down having the aforementioned overlapping edges.

In case the two opposite edges of the component laid down are substantially abutting to and matching with each other, such main length is substantially null.

In case the two opposite edges are not in contact with each other, such main length is the circumferential length of the "empty" segment separating the two ends of the component.

The "overall length" of a component has to be intended as the length of the component measured according to the direction along which the component itself moves forward while it is laid down on the forming drum.

WO2013/011396 describes an apparatus for building tyres for vehicle wheels, wherein the forming drum is loaded on a shuttle moving on a guide along a laying line. At each delivery station, at least one semi-finished product is laid down on a radially external surface of the forming drum carried by the shuttle to form at least one component of a tyre.

EP2613122A1 describes a method and an apparatus for detecting shapes such as length and junction dimensions of a strip-shaped element such as a carcass ply and a two-dimensional displacement sensor employed in the detection of the shape of the strip-shaped element.

SUMMARY OF THE INVENTION

The Applicant observed that the techniques of the type shown in EP2613122A1 are limited to provide information representative of the analysis performed on the junction area, without making such information able to act, to some extent, on the building apparatuses of the tyre.

In particular, the Applicant observed that, in order to let such information have an actual practical utility, it is necessary that a human operator intervenes and, according to the information itself, decides to discard the component and/or sets appropriate correction parameters in the preparation stations of the component laid down.

The Applicant verified that, in spite of the use of such systems, the operations of regulation/correction carried out manually are, however, not much reliable.

Indeed, although the starting datum (information representative of the main length of the component laid down and/or of the suitability of the junction) can be considered correct and reliable, the extent of the correction to be made in the subsequent components remains at the full discretion of the operator, and in particular it is based on the experience and on the attention of the latter.

This makes the control and the correction process not reliable enough and makes its results not very replicable.

The Applicant observed also that there are a plurality of parameters on which the operator can act to correct the preparation of the component; this implies that the control that is manually carried out by the operator itself is even more problematic.

The Applicant observed also that the operator has great difficulties in manually managing the correction parameters in plants where different components are prepared and laid down in parallel, and thus there are different machines/stations operating simultaneously that have to be controlled and possibly corrected, such as for example in plants of the type described in the document WO2013/011396 previously described.

The Applicant thus had the intuition that, by adjusting automatically the preparation of the components as a function of the main length detected, it is possible to improve progressively the precision of the positioning of the two ends of each component and, consequently, the structural characteristics of the tyre.

The Applicant also perceived that, by controlling the cutting of the material as a function of the main length detected after the laying down, it is possible to determine accurately the overall length of the subsequent components in order to obtain the desired arrangement of the two ends of the latter.

The Applicant thus found that, by sending a signal generated as a function of the main length detected to a preparation station adapted to prepare said component, and by regulating said preparation station on the basis of the information contained in said signal, the precision of the positioning of the ends of the components subsequently laid down can be remarkably improved.

In accordance with a first aspect, the invention refers to a method for controlling the laying down of components of tyres on forming drums.

Preferably said method comprises sending a first electromagnetic radiation incident on a first laying structure comprising a forming drum and a first component of a tyre laid down on said forming drum.

Preferably said method comprises detecting at least one corresponding first reflected radiation.

Preferably said method comprises determining, as a function of said first reflected radiation a first parameter representative of a first main length of said first component.

Preferably said method comprises comparing said first parameter with one or more pre-stored reference parameters.

Preferably said method comprises generating a first correction signal as a function of said comparison.

Preferably said method comprises sending said first correction signal to at least one preparation station of said first component to regulate the preparation of further components.

In accordance with another aspect, the invention refers to an apparatus for controlling the laying down of components of tyres on forming drums.

Preferably said apparatus comprises an emission device to send a first electromagnetic radiation incident on a radially external surface of a first laying structure comprising a forming drum and a first component of a tyre laid down on said forming drum.

Preferably said apparatus comprises a detection device to detect at least one corresponding first reflected radiation.

Preferably said apparatus comprises a processing unit.

Preferably said processing unit is configured for determining, as a function of said first reflected radiation, a first parameter representative of a first main length of said first component.

Preferably said processing unit is configured for comparing said first parameter with one or more pre-stored reference parameters.

Preferably said processing unit is configured for generating a first correction signal as a function of said comparison.

Preferably said processing unit is configured for sending said first correction signal to at least one preparation station adapted to prepare said first component to regulate the preparation of further components.

The Applicant believes that, in this way, the correction technique applied to the preparation station adapted to prepare the components to be laid down is more accurate and reliable, as it is substantially independent of high variable and unpredictable factors such as the ability, the attention and the experience of the operator in charge of the control of the plant.

In particular, the overall length of the components that will have to be laid down can be corrected as a function of the inaccuracies detected at the ends of the component already laid down.

In accordance with one or more of the aforementioned aspects, the invention comprises one or more of the following preferred characteristics.

Preferably, a queue is arranged comprising one or more auxiliary components ready to be laid down on said forming drum, said auxiliary components being prepared by said preparation station before receiving said first correction signal.

Preferably, each one of said auxiliary components is waited to be laid down on, and afterwards removed from, said forming drum.

Preferably a second component is identified and laid down on said forming drum after said auxiliary components, said second component being prepared by said preparation station after receiving said first correction signal.

Preferably, when said second component is laid down on said forming drum, a second electromagnetic radiation is sent being incident on a second laying structure comprising said forming drum and said second component laid on said forming drum.

Preferably, at least one corresponding second reflected radiation is detected.

Preferably, a second parameter representative of a second main length of said second component is determined as a function of said second reflected radiation.

Preferably, a second correction signal is generated as a function of said first parameter and of said second parameter.

Preferably said second correction signal is sent to said preparation station.

Preferably, when said second component is laid down on said forming drum, said emission device is activated to send a second electromagnetic radiation incident on a second laying structure comprising said forming drum and said second component laid down on said forming drum.

Preferably, a second parameter representative of a second main length of said second component is detected as a function of a second reflected radiation detected by said detection device.

Thus it is possible to further improve the precision of the positioning of the ends of the component laid down, and in particular the main length of the component itself.

The Applicant observed, indeed, that a series of factors such as, for example, the conditions wherein the plant operates, the temperature of the workplace which is not always constant, the fact that the reels of material from which the components are obtained cannot be identical to one another, the wear and the lengthening of the belts transporting the semi-finished products, etc., can provoke a drift of the preparation station adapted to prepare the components, namely a condition wherein the behaviour of the devices that are part of said preparation station progressively deviates from the expected one.

Furthermore, with the aim of minimizing the idle time between the component deposition step and the subsequent operation, a queue of components is created before the latter are laid down on the forming drums.

This implies that once a determined correction is set for the preparation station, yet a certain number of components (equal to the number of components forming the queue) will be laid down before the effects of such correction are visible.

The Applicant observed in this regard that, for several reasons, the exact number of the components forming a queue is not always known to the operator.

Firstly, the operator does not know the instant in time when the components are cut before being put in the queue; in other words, the operator cannot know if the correction inserted in a certain instant is applied also to components that, in that instant, are not part of the queue, yet, but that are about to be cut, or if such components have already been cut and thus the number of components in the queue will increase in a very short time.

Furthermore, different types of components and different types of materials imply queues comprising different quantities of components, so that the operator can hardly know and/or remember the exact number of components that form each queue.

In addition to this, in plants that are at least partially automated, such as the one of the type described in WO 2013/011396, different types of components may be made in parallel in the same plant, so that the same operator is in charge of controlling different lines simultaneously wherein the queues comprise different quantities of components. The Applicant thus observed that the operator, after having set a determined correction, cannot identify with a reasonable reliability which are the components where such correction had an effect, and he/she cannot understand if the inaccuracy previously detected was substantially corrected or if, on the contrary, it is necessary to further refine the adjustment.

The Applicant thus believes that, by generating the second correction signal as a function of said first parameter and of said second parameter, it is possible to further improve the precision and the reliability of the corrections made to the preparation station.

Preferably, generating said second correction signal as a function of said first parameter comprises generating said second correction signal as a function of said first correction signal.

Thus it is possible to progressively correct the functioning of the preparation station, keeping the correction previously made into consideration.

Preferably, when each one of one or more auxiliary components is laid down on said forming drum, an auxiliary electromagnetic radiation is sent being incident on an auxiliary laying structure comprising said forming drum and said auxiliary component laid down on said forming drum.

Preferably, at least one corresponding auxiliary reflected radiation is detected.

Preferably, a respective auxiliary parameter representative of the main length of said auxiliary component laid on said building drum is determined as a function of said auxiliary reflected radiation.

Preferably, said second correction signal is generated as a function of also said auxiliary parameter.

Thus it is possible to make corrections to the preparation station also as a function of the positioning of the ends of the components laid down before the first correction signal could produce its effects.

Preferably an identification parameter is received being representative of a type and/or of a material at least of said first component.

Preferably a first algorithm associated to said identification parameter is selected. Preferably, at least said first parameter is determined on the basis of said first algorithm. Thus it is possible to determine the first parameter using an appropriate algorithm for the type of component laid down and/or for the material which the latter is made of. Preferably, said second parameter is determined on the basis of said first algorithm. Preferably, said one or more auxiliary parameters are determined on the basis of said first algorithm.

Preferably a second algorithm associated to said identification parameter is selected. Preferably, at least said first correction signal is generated on the basis of said second algorithm.

Thus the correction made to the preparation station can be determined appropriately according to an algorithm selected as a function of the type of component that was laid down.

Preferably, said second correction signal is generated on the basis of said second algorithm.

Preferably, waiting that each one of said auxiliary components is laid down on, and afterwards removed from, said forming drum comprises determining a number N representative of how many auxiliary components are included in said queue.

Preferably, waiting that each one of said auxiliary components is laid down on, and afterwards removed from, said forming drum comprises verifying that N auxiliary components are laid down on and subsequently removed from said forming drum.

Preferably, in order to wait that each one of said auxiliary components is laid down on, and afterwards removed from, said forming drum, said processing unit is configured to determine a number N representative of how many auxiliary components are included in said queue.

Preferably, in order to wait that each one of said auxiliary components is laid down on, and afterwards removed from, said forming drum said processing unit is configured to verify that N auxiliary components are laid down on and subsequently removed from said forming drum.

Preferably, said number N of auxiliary components in said queue is determined as a function of said identification parameter.

Preferably, a displacement parameter is determined as a function of said identification parameter.

Preferably, as a function of said displacement parameter, at least one emission device and one detection device are displaced adapted to emit at least said first incident electromagnetic radiation and to receive said first reflected electromagnetic radiation, respectively.

Thus the detection of the reflected radiations can be optimized, since the position of the emission device and of the detection device is determined as a function of the type of component that was laid down and/or of the material which the latter is made of. Preferably said displacement occurs along a direction substantially parallel to a rotation axis of said forming drum.

Preferably, a time parameter is determined representative of a waiting time of said second component after being prepared by said preparation station and before being laid down on said forming drum.

Preferably, said second correction signal is generated as a function of said time parameter.

Thus it is possible to make corrections of controlled extent in case the component had to wait for a long time between the building and the laying down.

The Applicant noticed in fact that the physical/geometrical characteristics of the awaiting component can vary over time. In particular, the Applicant noticed that, in the course of time, the dimensions of the component tend to reduce to a certain extent, as a function, for example, of the environmental characteristics and of the specific characteristics of the material which the component is made of. Such variations, although substantially imperceptible from a macroscopic point of view, may however affect remarkably the main length of the component, once the latter is laid down on the forming drum. The Applicant verified that the corrections based on the detection of such main length do not bring any improvement of the functioning of the preparation station, and, on the contrary, they contribute to generate noise in the control data, thus slowing down the convergence of the system towards an optimal functioning. The Applicant thus verified that, by decreasing the extent (or the intensity) of the correction set as a function of the waiting time of the component of which the main length is detected, it is possible to improve the quality of the corrections made and to speed up the convergence towards satisfactory operating condition.

Preferably said second correction signal is configured so as to provoke in said preparation station a modification whose amount is substantially monotonous decreasing in relation to the increase of said waiting time.

Preferably said emission device and said detection device are mounted on a support structure and are movable along one or more respective guides substantially parallel to a rotation axis of said forming drum.

Preferably at least an actuator active on said emission device and/or on said detection device is provided to move the latter along said one or more guides.

Preferably said processing unit is configured to receive an identification parameter representative of a type and/or of a material of at least said first component.

Preferably said processing unit is configured to command said at least an actuator as a function of said identification parameter.

Accordingly the apparatus according to the invention can adapt in an optimal way to components having different characteristics, thus improving the quality of the detection performed and, consequently, the quality of the corrections made.

BRIEF DESCRIPTION OF THE DRAWINGS

Further characteristics and advantages will become more clear from the detailed description of a preferred, but not limitative, embodiment of the invention. Such description is provided in the following with reference to the attached figures, given by way of example and thus not limitative, wherein.

DETAILED DESCRIPTION OF THE INVENTION

With reference to the attached figures, 1 indicates overall an apparatus for controlling the laying down of tyre components on forming drums in accordance with an aspect of the present invention.

The apparatus 1 can be advantageously used in a plant for producing tyres for vehicle wheels, wherein the manufacturing of each tyre is made by sequentially laying down one or more components on respective forming drums.

Each forming drum can receive components from different delivery or preparation stations. In plants that are at least partially automated, for example of the type shown in document WO2013/011396, the forming drums can be moved by means of appropriate devices between different operating positions, in which they receive respective components for building the tyre.

Figure 1:
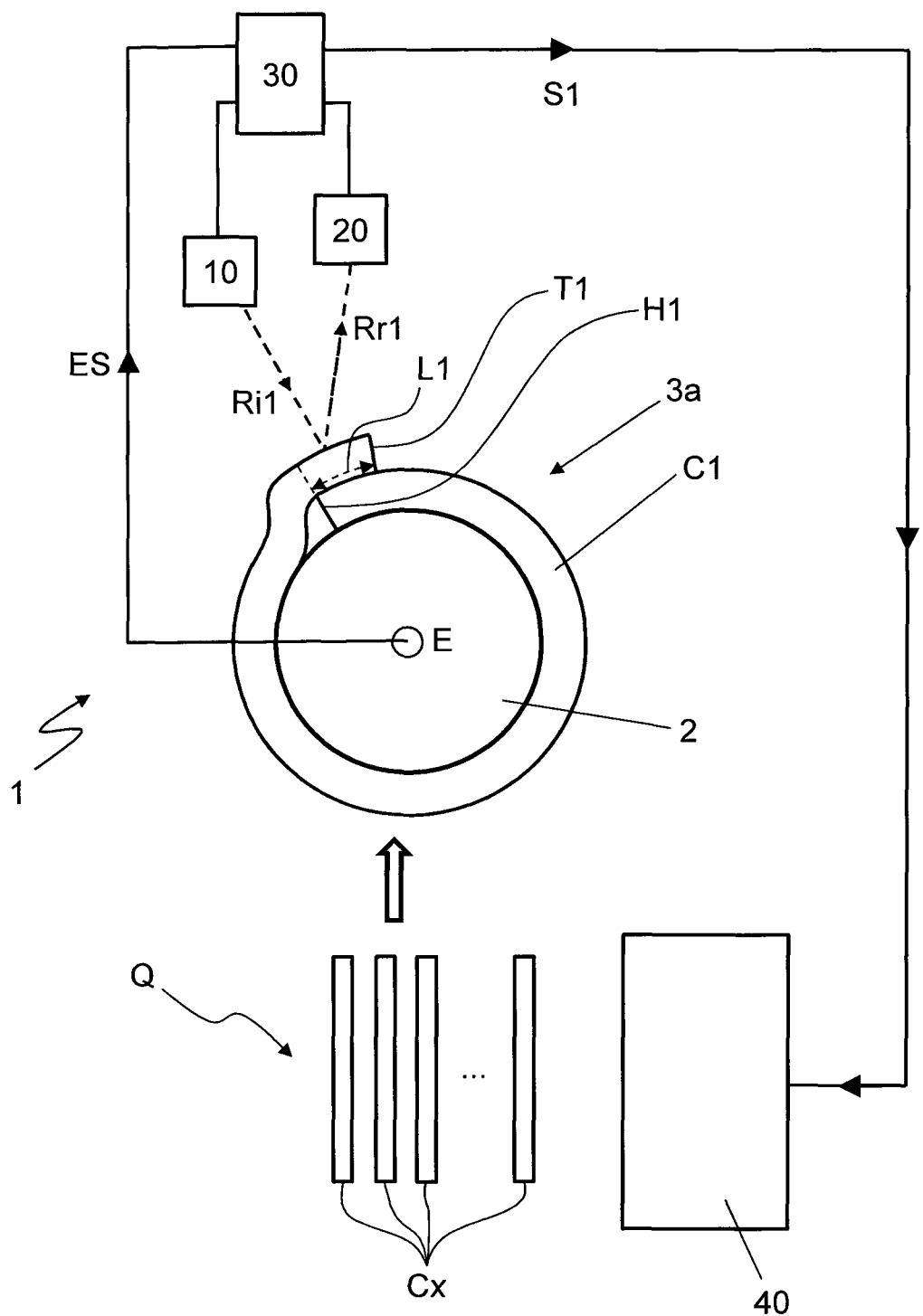
FIGS. 1-3 schematically show an apparatus in accordance with an aspect of the present invention, while it operates in different operating steps.
Figure 2:
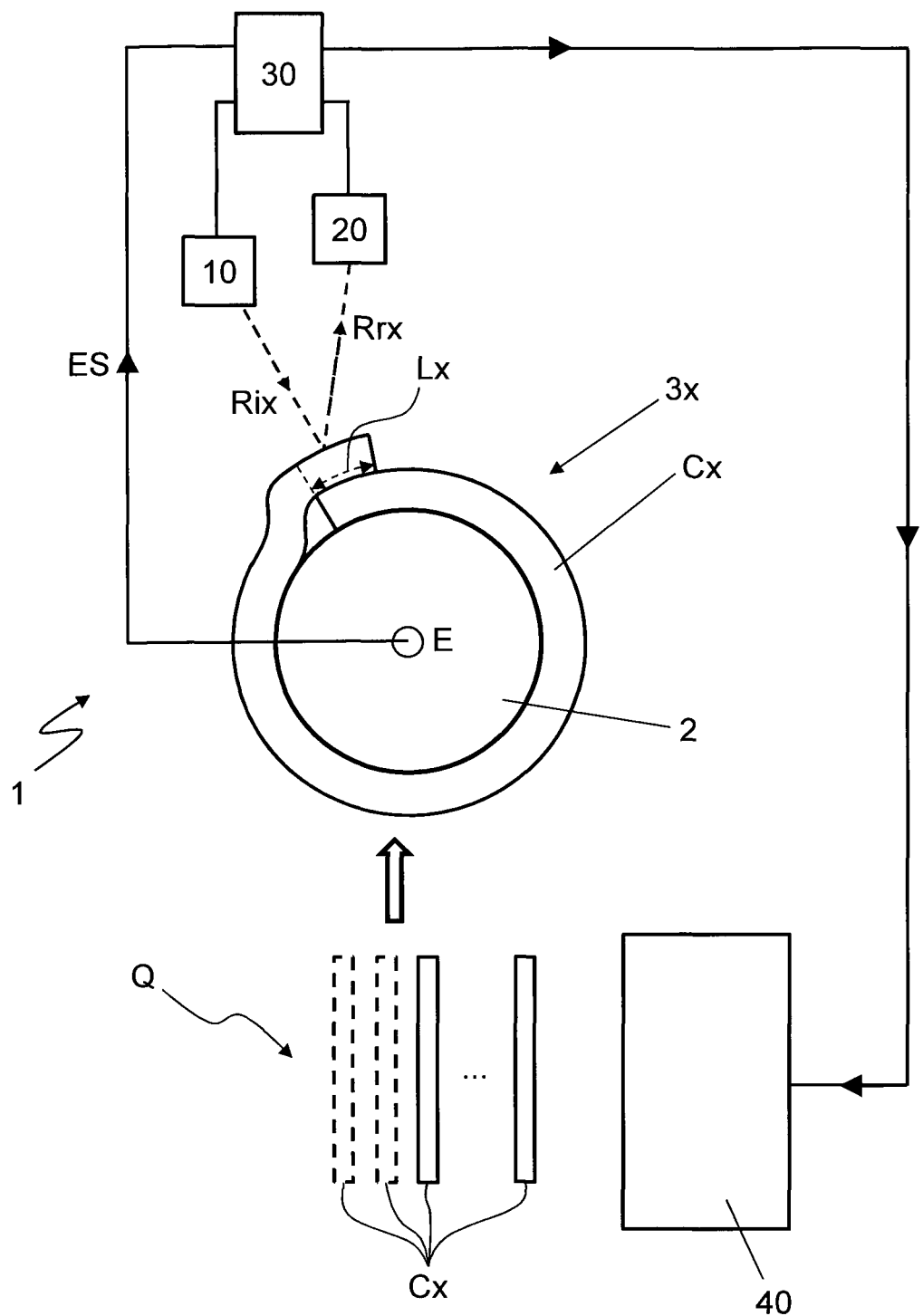
Figure 3:
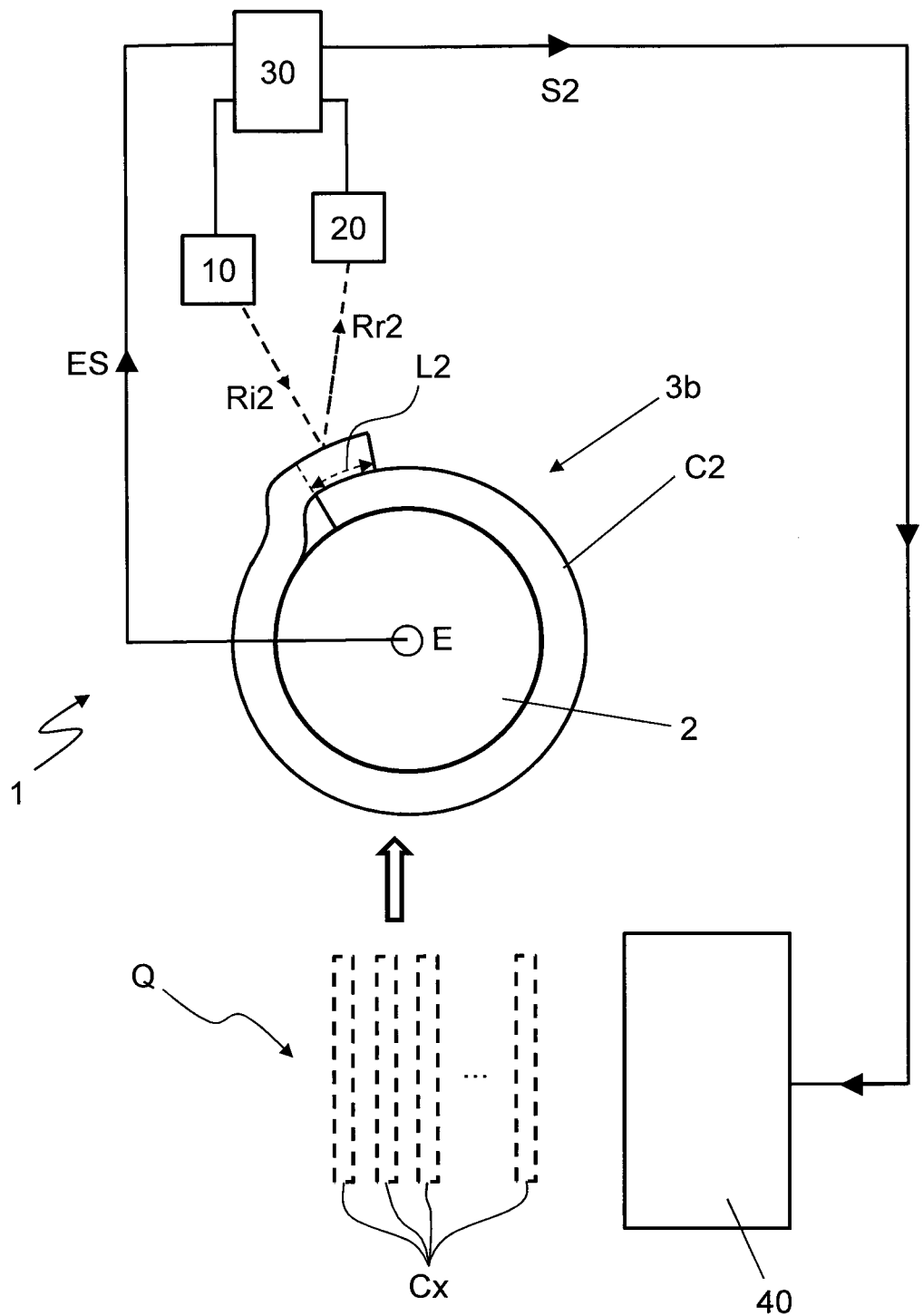

In FIGS. 1-3 block 40 represents, by way of example, a preparation station which provides components to be laid down on a forming drum 2.

In an embodiment, the component that has to be laid down is initially provided as a festoon and is cut to size in the preparation station 40 by means of an appropriate cutting device (not shown), according to preset length parameters.

The forming drum 2 has preferably a substantially cylindrical shape, and is configured so as to rotate around its longitudinal symmetry axis X.

FIG. 1 shows a first component C1 laid down on the forming drum 2, so as to form a first laying structure 3a.

The first component C1 may comprise, for example, an under-liner, a liner, one or more carcass plies, one or more belt layers, an underlayer, a tread band, etc; in general the first component C1 may be any functional component of the assembled tyre in the form of a cut-to-size strip.

FIG. 2 shows a generic auxiliary component Cx laid down on the forming drum 2, so as to form an auxiliary laying structure 3x.

FIG. 3 shows a second component C2 laid down on the forming drum 2, so as to form a second laying structure 3b.

The first component C1, the auxiliary component Cx and the second component C2 are represented separately since they are laid down on the same forming drum 2 in different instants.

It has to be noted that in FIG. 1-3 the thickness of the component laid down and the magnitude of the overlapped part between the two ends are intentionally increased with respect to the dimensions of the other elements shown in order to better underline some features of the invention.

Preferably, the time in which the components are laid down on the forming drum 2 is comprised between about 0.8 s and about 1.2 s.

The apparatus 1 comprises an emission device 10 to send a first electromagnetic radiation Ri1 incident on a radially external surface of the first laying structure 3a. The first incident radiation Ri1 is preferably a laser radiation, having a wave length comprised between about 630 nm and 650 nm.

In a preferred embodiment, the emission device 10 comprises a first and a second emitter 11, 12, appropriately spaced apart from each other, so as to direct the radiations on predetermined portions of the laying structure 3a.

The apparatus 1 further comprises a detection device 20 associated to the emission device 10.

The detection device 20 is adapted to detect at least one first reflected radiation Rr1 generated by the reflection, on the radially external surface of the first laying structure 3a, of the first incident radiation Ri1.

In a preferred embodiment, the emission device 20 comprises a first and a second detector 21, 22, respectively associated to said first and second emitter 11, 12, so as to detect the reflected radiations coming from the first laying structure 3a.

Preferably the first emitter 11 and the first detector 21 are integral with each other; preferably the second emitter 12 and the second detector 22 are integral with each other.

Advantageously, the emission device 10 and the detection device 20 are mounted on a guide G.

Figure 4:
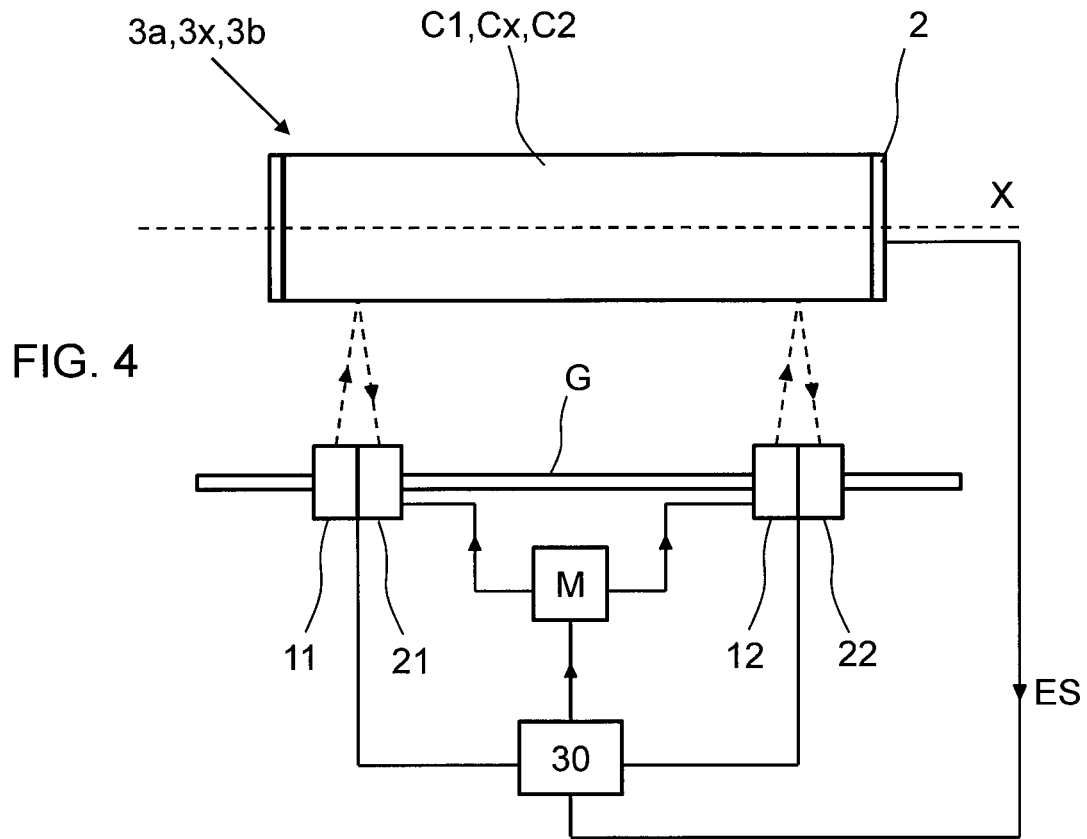
FIG. 4 schematically shows the apparatus of FIGS. 1-3 according to a different angle.
Figure 5:
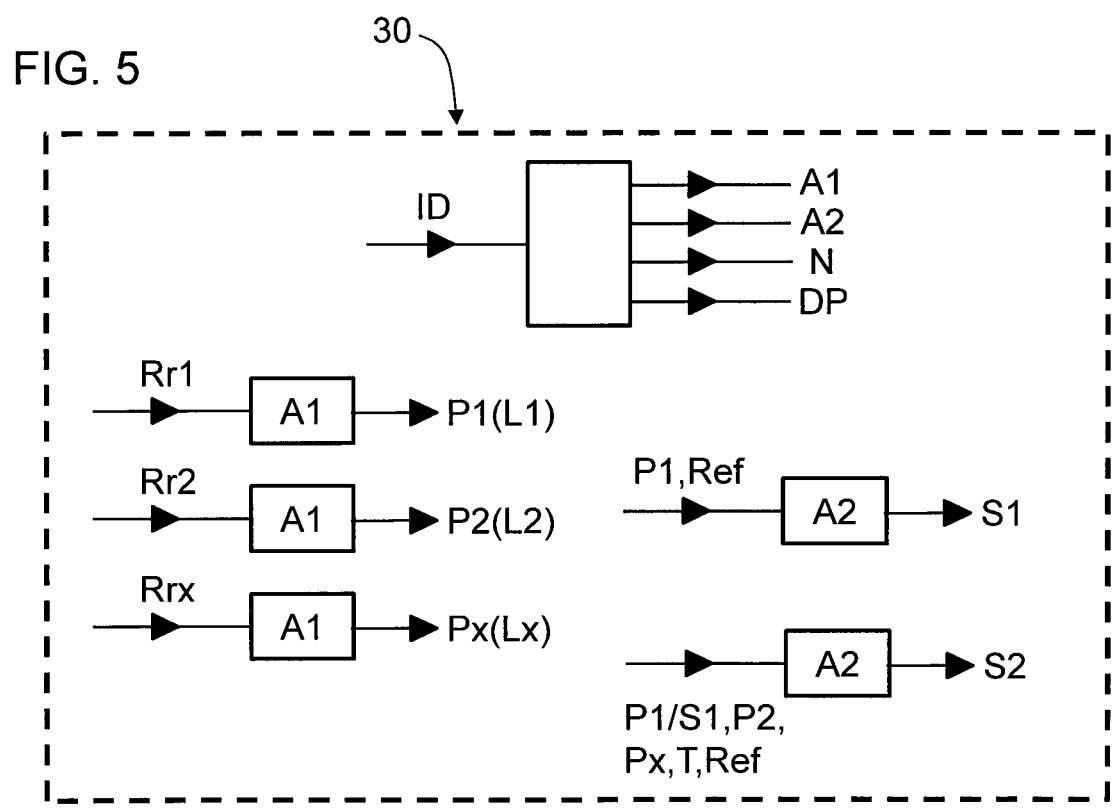
FIG. 5 shows a block diagram of a processing unit included in the apparatus shown in FIGS. 1-4.

FIG. 4 shows schematically the emitters 11, 12 and the detectors 21, 22 mounted on the guide G.

Preferably the guide G is substantially parallel to the longitudinal axis of symmetry X of the forming drum 2.

Preferably, at least during the functioning of the apparatus 1, the emission device 10 and the detection device 20 are integral to the support structure of the forming drum 2. Apart from the rotation of the forming drum 2 around its axis of rotation X, the emission device 10 and the detection device 20 are integral with the forming drum 2 itself.

Preferably the guide G is substantially integral with the support structure of the forming drum 2.

Preferably the first emitter 11 and the first detector 21 are movable along said guide G. Preferably the second emitter 12 and the second detector 22 are movable along said guide G.

Preferably the first emitter 11 and the first detector 21 are movable in relation to the second emitter 12 and the second detector 22.

As it will be more clear in the following, the displacement of the first emitter 11, first detector 21, second emitter 12 and the second detector 22 can be controlled in an automatic way.

Preferably the distance between the emission device 10 and the forming drum 2 and the distance between the detection device 20 and the forming drum 2 are adjusted manually, for example at each "fitting change", namely at each change of the diameter of said drum.

Advantageously the apparatus 1 further comprises a processing unit 30.

The processing unit 30 is operatively associated to at least the detection device 20 in order to determine, as a function of said first reflected radiation Rr1, a first parameter P1 representative of the first main length L1 of the first component C1.

In FIG. 1 it is possible to observe that the first main length L1 represents the distance between the head edge H1 of the first component C1, namely the end that is laid down first, and the tail edge T1, namely the end that is laid down second.

The first parameter P1 can be expressed in degrees or radians, so as to indicate the angular distance between the two end edges of the first component C1.

In addition or as an alternative, the first parameter P1 can be expressed in millimetres, so as to indicate the length of the path separating the two ends.

In the preferred embodiment, the processing unit 30 is configured to initially determine the angular distance between the head H1 and the tail T1, which is then multiplied by the radius of the first laying structure 3a to obtain the value in terms of length.

It has to be noted that, as the radius of the first laying structure 3a, the radius of the forming drum 2, or an average radius of the laying structure 3a itself, can be used. Preferably, in order to determine the first parameter P1, the processing unit 30 uses also an encoder signal ES coming from an encoder E configured to detect the angular position in time of the forming drum 2.

In practice, the processing unit 30 can comprise the hardware/software structure that is necessary for conditioning the signals received by the detection device 20, for the subsequent measurement, for displaying the results (for example for the operator in charge of supervising the functioning of the system) and for the data recording relating to the various functions/activities carried out.

In particular, the signals provided by the detection device 20 are initially processed by an amplifier, which carries out a first conditioning of the same establishing their scaling and the sampling time. Said amplifier generates a pair of analogue signals that is provided in input to a measuring module. The latter operates preferably in real time.

By means of an appropriate user interface, realized for example as a conventional PC, several data and functions can be made available to the operator, such as for example:

displaying the measurements performed with the indication of the respective suitability evaluation;

displaying a graphic representation of the junction area of the component laid down and of the relating detailed data, useful for a fine-tuning of the system;

possibility of setting evaluation limits to respect the arrangements defined by the project specifications or "recipe";

possibility of parameterizing and calibrating the system;

displaying of the data recording of all the measurement performed and possible transmission in real time to a remote database.

In short, as a function of the first reflected radiation Rr1, the processing unit 30 determines at which distance from the detection device 20 the radially external position of the first laying structure 3a is situated.

In the preferred embodiment, such distance allows to follow the profile defined by the radially external surface of the head edge H1 of the first component C1, subsequently defined by the tail edge T1 of the first component C1 itself.

Thus the position of the head edge H1 and of the tail edge T1 are detected, so as to determine the first parameter P1 representative of the first main length L1.

In case the first and the second detector 21, 22 are provided, the calculation of the parameter P1 can be performed as an average of corresponding partial parameters determined as a function of the measurements performed by the single detectors 21, 22. Preferably, the sampling frequency used for detecting the reflected radiations is comprised between about 15 KHz and about 25 KHz.

Preferably the angular resolution obtained is comprised between about 0.01° and about 0.1°.

Preferably a vertical resolution is used, namely according to the direction in which incident and reflected radiations propagate, comprised between about 5 μm and about 15 μm.

In general, different algorithms can be used to determine the first parameter P1. In a preferred embodiment, the algorithm to be applied can be selected among a plurality of pre-stored algorithms.

In particular, the processing unit 30 can be configured to receive an identification parameter ID in input, representative of the type of component that has to be laid down on the forming drum 2 and/or of the material which such component is made of the identification parameter ID is preferably representative of the type and/or of the material of the first component C1.

As a function of the identification parameter ID received, the processing unit 30 selects a first algorithm A1 which allows to determine the first main length L1 of the first component C1 on the basis of the first reflected radiation detected Rr1.

The identification parameter ID is preferably sent to the processing unit 30 of the control apparatus (for example a PLC) which supervises the functioning of the whole machine. Such control apparatus is equipped with a memory where the operation program of the machine itself is loaded, thus it knows in advance which components will be made and prepared for a laying down on the forming drum 2.

By way of example, the identification parameter ID can be representative of the width of the components that is about to be provided to the forming drum 2, namely the dimension of the component measured parallel to the axis of rotation X.

The first parameter P1 can thus be calculated as a function of the first reflected radiation Rr1 by means of the first algorithm A1.

Once the first parameter P1 has been determined, the processing unit 30 is configured to compare the first parameter P1 itself with one or more pre-stored reference values Ref. The reference values Ref can be representative, for example, of the desired distance between the head H1 and the tail T1 of the first component C1 after the latter was laid down.

Such desired distance can be indicative of the fact that the head and the tail must not be overlapping, and that it is necessary to leave a space having a predetermined length, precisely equal to the desired distance, between the head and the tail.

Figure 6A:
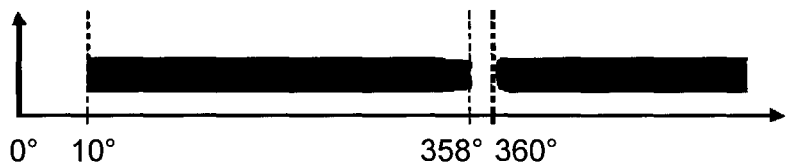
FIGS. 6a, 6b and 6c show examples of three different types of junctions relating to the same component.

The example shown in FIG. 6a relates to a liner having a so-called "short" junction (interval of 2°).

In another example, the desired distance can be substantially equal to zero, and indicate that head and tail have to be abutting and substantially joining to each other.

Figure 6B:
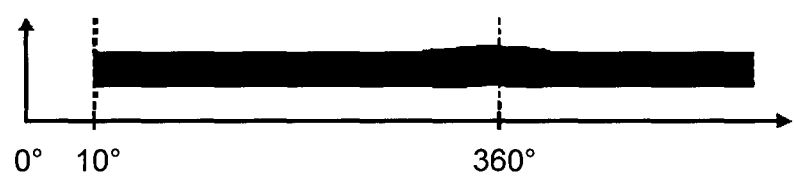

The example shown in FIG. 6b relates to a liner having a so-called "head to head" junction.

In a further example the desired distance can be indicative of the fact that head and tail have to be overlapping (in particular the tail has to be placed over of the head) and the overlapped part has to have a predetermined length, equal to the desired distance. In this case, the desired distance can be of opposite sign with respect to the first example, wherein head and tail are not in contact with each other.

Figure 6C:
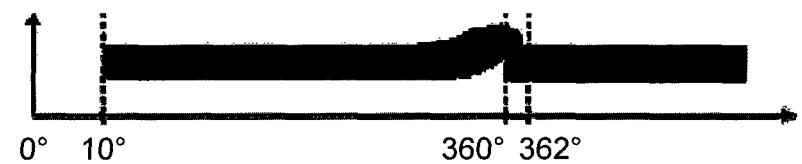

The example shown in FIG. 6c relates to a liner having a so-called "long" junction (overlapped part of 2°).

Preferably the reference values Ref define an acceptability interval for the first parameter P1.

The comparison between the first parameter P1 and said one or more reference values Ref can thus provide indications relating to the precision of the overall length of the first component C1. In fact, taking for granted that the first component C1 is laid down properly, a variable that is able to substantially affect the first main length L1 is the overall length of the first component C1.

If the comparison between the first parameter P1 and the reference value Ref shows that the first main.length L1 is not the desired one, the processing unit 30 generates a first correction signal S1 addressed to the preparation station 40.

By means of the first correction signal S1 it is thus possible to correct the preparation of further components, for example by progressively modifying the overall length of such components.

If the parameter P1 is then too far from the desired value and/or too much outside the acceptability interval, a command signal is also generated so that the component in question is automatically moved to a control zone, wherein an operator can evaluate if the component itself has to be discarded or can be somehow recovered.

The first correction signal S1 is generated as a function of a determined algorithm, so as to obtain the desired effects on the preparation of the subsequent components. Such algorithm can be advantageously selected among a plurality of pre-stored algorithms.

For example, as a function of the aforementioned identification parameter ID, the processing unit 30 can select a second algorithm A2 by means of which, as a function of the first parameter P1 and of the respective reference values Ref, the first correction signal is generated S1.

In order to avoid any idle time and make the production as much efficient as possible, the preparation station 40 preferably arranges a queue Q of components ready to be laid down on the forming drum 2 after the first component C1. Such queue Q is arranged before the first component C1 is analyzed as described above.

Thus, said N number of components forming part of the queue Q (in the following referred to as auxiliary components Cx), the effects of the first correction signal S1 will be felt starting from the $(N+1)^{th}$ component, namely the first component prepared by the preparation station 40 after having received the first correction signal S1.

The processing unit thus waits for all the auxiliary components Cx to be laid down on the forming drum 2 and to be removed from the latter (namely for the forming drum 2 to pass to a subsequent machining after having released the tyre that was being made).

Thus the processing unit 30 identifies a second component C2, laid down on the forming drum 2, after that all the auxiliary components Cx are laid down and removed from said forming drum 2.

The second component C2 is prepared by the preparation station 40 after that the latter received the first correction signal S1.

In a preferred embodiment, the second component C2 is the $(N+1)^{th}$ component laid down on the forming drum 2 after the first component C1, namely it is the component laid down on the forming drum 2 just after that the queue Q ended.

The second component C2 is treated by the apparatus 1 exactly as the first component C1: a second incident radiation Ri2 is sent on the radially external surface of the second laying structure 3b (formed by the forming drum 2 and by the second component C2) and, as a function of the corresponding second reflected radiation Rr2, a second parameter P2 is determined, representative of the second main length L2, namely of the distance between the head edge and the tail edge of the second component C2.

Preferably the second parameter P2 is determined by using the first algorithm A1, selected on the basis of the identification parameter ID.

Preferably, in order to identify the second component C2, the processing unit 30 determines a number N representative of how many auxiliary components Cx form part of the queue Q.

In particular, the number N can be determined as a function of the identification parameter ID: for each type of component, in fact, a queue comprising a different number of elements can be arranged. The processing unit 30, in one of its own memory registers, has this type of information available and, as a function of the identification parameter ID, it can determine the correct number N for the type of component in question.

The processing unit 30 will then have to simply count how many components are laid down after the first component C1 and will then be able to identify the second component C2 after all the other N auxiliary components Cx of the queue Q ended.

As a function of the second parameter P2, the processing unit 30 generates the second correction signal S2 and sends the latter to the preparation station 40, so as to further correct the preparation of the subsequent components.

Preferably, the second correction signal S2 is generated not only on the basis of the second parameter P2, but also as a function of the first parameter P1.

More in particular, the second correction signal S2 is generated as a function of the second parameter P2 and of the first correction signal S1: thus the new correction takes into account the previously made correction (first correction signal S1) and the effects the latter produced (second parameter P2).

By operating in this way, it is possible, over time, to make the functioning of the preparation station 40 converge to an optimal operating condition, thus avoiding that remarkable quantities of components have to be discarded or at least modified before being used.

Preferably the second correction signal S2 is generated as a function of the second parameter P2, on the basis of the second algorithm A2 selected as a function of the identification parameter ID.

Preferably the second correction signal S2 is generated also as a function of a comparison between the second parameter P2 and the aforementioned reference values Ref, namely the values representative of the desired main length.

Preferably the reference values Ref are selected within a pre-stored table as a function of the aforementioned identification parameter ID.

In an embodiment also the main length of one or more auxiliary components Cx can be detected. To that end, when an auxiliary component Cx, whose main length has to be determined, is laid down on the forming drum 2, an auxiliary incident radiation Rix is sent on the auxiliary laying structure 3x thus obtained. The corresponding auxiliary reflected radiation Rrx is then detected and, as a function of the latter, the processing unit 30 determines an auxiliary parameter Px representative of the main length Lx of said auxiliary component Cx.

The main parameters Px can be determined on the basis of the first algorithm A1, in the same way as the first parameter P1 and the second parameter P2 are preferably determined.

The auxiliary parameters Px may advantageously contribute to the content of the second correction signal S2: the auxiliary parameters Px, in fact, may allow to identify the functioning of the preparation station 40 in the absence of the first correction signal S1 and they may thus be significant in the setting of the second correction.

In an embodiment, the main length of all the auxiliary components Cx is determined; in an alternative embodiment, only some of the auxiliary components are considered for this aim.

It has to be noted that the second incident radiation Ri2 and/or the auxiliary incident radiations Rix are preferably generated by the emission device 10, and thus have the same physical characteristics as the first incident radiation Ri1.

Preferably, the second reflected radiation Ri2 and/or the auxiliary reflected radiations Rrx are detected by the detection device 20.

Preferably, as a function of the identification parameter ID, the processing unit 30 can determine a displacement parameter DP. As a function of such displacement parameter DP, the processing unit 30 commands an actuator M for the movement of the emission device 10 and/or of the detection device 20.

More in detail, the actuator M can move, along the mentioned guide G, the first emitter 11 and the first detector 21 and/or the second emitter 12 and the second detector 22, so as to position them in the most appropriate way as a function of the component that has to be examined.

In an embodiment, the processing unit 30 is configured to determine a time parameter T representative of a waiting time of the second component C2 after being prepared by said preparation station 40 and before being laid down on said building drum 2. Advantageously, the second correction signal S2 is generated as a function of said time parameter T.

Figure 7:
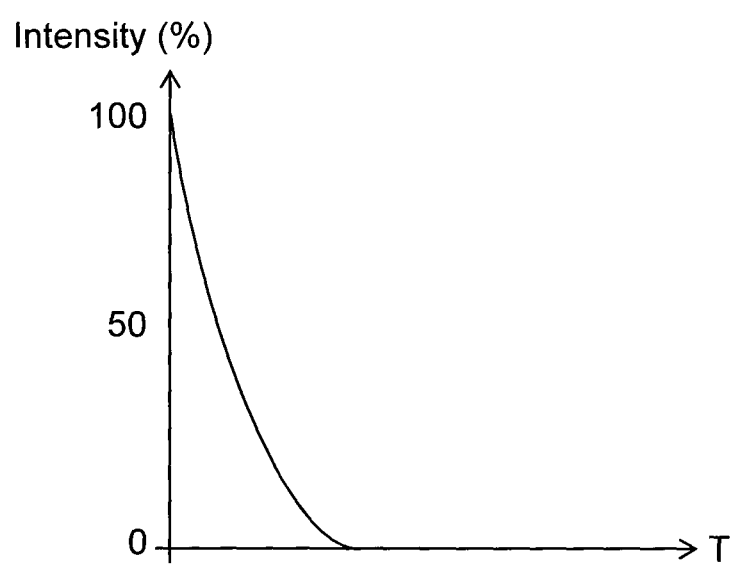
FIG. 7 shows a diagram representative of magnitudes used in the apparatus and in the method in accordance with the present invention.

Thus it is possible to take into account the modifications that the second component C2 may have undergone during the waiting time and to modulate the respective correction to be set accordingly. More in particular, the longer is the waiting time, the smaller will be the extent of the correction to be made. By way of example, the second signal S2 may determine a correction of the overall length of the components prepared subsequently; in case the waiting time of the second component C2 is too long, the respective correction made to the overall length of the subsequent components would be of a reduced extent. FIG. 7 shows, only by way of example, a relation that may exist between the time parameter T and the entity of the variation set by means of the second correction signal S2. The waiting time after which the supposed correction can be considered not significant can be comprised, for example, between about 5 minutes and about 10 minutes.

It has to be noted that the technique for modulating the intensity of the correction described above with reference to the second component C2 and to the respective second correction signal S2 may be applied also to other components examined, such as for example the first component C1, the auxiliary component/s Cx examined, possible subsequent components prepared to the preparation station 40 and laid down on the forming drum 2.

It has to be noted that the invention was here described and claimed with reference to the first component C1, to the second component C2 and to the auxiliary components Cx. In practice, the invention can be actuated with much longer component sequences. Each sequence comprises a substantial repetition of the pattern formed by the first component C1, by the auxiliary components Cx and by the second component C2. In particular, the first component of each pattern preferably coincides with the second component of the previous pattern. Preferably, the correction signals generated after the analysis of the components of a determined pattern are a function not only of the parameters (first parameter, second parameter, possible auxiliary parameters) calculated with reference to that pattern, but also as a function of the parameters determined during the analysis of previous patterns. Thus the processing unit 30 can identify and correct in an appropriate and precise way a possible malfunctioning of the preparation station 40.

It has to be noted that the processing unit 30 can be made as a single hardware device or by the association of several devices connected to each other; said device/s are appropriately programmed by means of applications and/or software routines in order to carry out the operations herein described and claimed.

The use of the method and of the apparatus according to the invention showed advantageous results, thanks to the high precision obtained in the positioning of the ends of each component.

By way of example, it can be illustrated that in a lot of 180 tyres built by using the aforementioned method and apparatus, the average value of the main length relating to the liner diverged by the expected average value of about 1%, while in a subsequent lot of 540 tyres that did not use the aforementioned method, such average value diverged up to 10%, thus requiring the human intervention of the operator.

The invention claimed is:

1. A method for controlling the laying down of components of tyres on forming drums, comprising:

sending a first electromagnetic radiation incident on a first laying structure comprising a forming drum and a first component of a tire laid down on said forming drum;

detecting at least one corresponding first reflected radiation;

determining, as a function of said first reflected radiation, a first main length of said first component, wherein the first main length is a circumferential distance between a first end laid down and a second end laid down of the first component;

comparing said first main length with one or more pre-stored reference parameters;

generating a first correction signal as a function of said comparison; and sending said first correction signal to at least one preparation station adapted to prepare said first component to regulate the preparation of further components, wherein a queue is arranged comprising one or more auxiliary components ready to be laid down on the forming drum, the auxiliary components being prepared by the preparation station before receiving the first correction signal, comprising:

waiting until each one of the auxiliary components is laid down on, and afterwards removed from, the forming drum;

identifying a second component laid down on said forming drum after said auxiliary components, the second component being prepared by the preparation station after receiving the first correction signal;

when the second component is laid down on the forming drum, sending a second electromagnetic radiation incident on a second laying structure comprising the forming drum and the second component laid down on the forming drum;

detecting at least one corresponding second reflected radiation;

determining, as a function of the second reflected radiation, a second main length of the second component, wherein the second main length is a circumferential distance between a first end laid down and a second end laid down of the second component;

determining a time parameter representative of a waiting time of said second component after being prepared by said preparation station and before being laid down on said forming drum;

generating a second correction signal as a function of said first main length, of the second main length and of the said time parameter; and sending the second correction signal to the preparation station.

2. The method according to claim 1, wherein generating said second correction signal as a function of said first main length comprises generating said second correction signal as a function of said first correction signal.

3. The method according to claim 1, wherein waiting for each one of said auxiliary components to be laid down on, and afterwards removed from, said forming drum comprises:

determining a number N representative of how many auxiliary components are included in said queue; and verifying that N auxiliary components are laid down on, and afterwards removed from, said forming drum.

4. The method according to claim 1, comprising:

when each one of one or more of the auxiliary components is laid down on said forming drum, sending an auxiliary electromagnetic radiation incident on an auxiliary laying structure comprising said forming drum and said auxiliary component laid down on said forming drum;

detecting at least one corresponding auxiliary reflected radiation;

determining, as a function of said auxiliary reflected radiation a respective auxiliary parameter representative of a main length of said auxiliary component laid down on said forming drum; and generating said second correction signal as a function also of said auxiliary parameter.

5. The method according to claim 1, comprising receiving an identification parameter representative of a type and/or of a material at least of said first component.

6. The method according to claim 5, comprising:

selecting a first algorithm associated to said identification parameter; and determining at least said first main length based on said first algorithm.

7. The method according to claim 6, wherein sending said second correction signal to said preparation station, comprises determining the second main length based on said first algorithm.

8. The method according to claim 6, wherein when each one of one or more of the auxiliary components is laid down on said forming drum, sending an auxiliary electromagnetic radiation incident on an auxiliary laying structure comprising said forming drum and said auxiliary component laid down on said forming drum;

detecting at least one corresponding auxiliary reflected radiation;

determining, as a function of said auxiliary reflected radiation a respective auxiliary parameter representative of the main length of said auxiliary component laid down on said forming drum; and generating said second correction signal as a function also of said auxiliary parameter, comprising determining said one or more auxiliary parameters based on said first algorithm.

9. The method according to claim 6, wherein waiting for each one of said auxiliary components to be laid down on, and afterwards removed from, said forming drum comprises:

determining a number N representative of how many auxiliary components are included in said queue; and verifying that N auxiliary components are laid down on, and afterwards removed from, said forming drum, wherein said number N of auxiliary components in said queue is determined as a function of said identification parameter.

10. The method according to claim 5, comprising:

selecting a second algorithm associated to said identification parameter; and generating at least said first correction signal on the basis of said second algorithm.

11. The method according to claim 10, the method further comprising generating said second correction signal based on said second algorithm.

12. The method according to claim 5, comprising:

determining a displacement parameter as a function of said identification parameter; and displacing as a function of said displacement parameter at least an emission device and a detection device suitable respectively to emit at least said first incident electromagnetic radiation and to receive at least said first reflected electromagnetic radiation.

13. The method according to claim 12, wherein said displacement occurs along a direction substantially parallel to a rotation axis of said forming drum.

14. The method according to claim 1, wherein said second correction signal is configured to cause a modification in said preparation station in a substantially monotonous decreasing amount with respect to an increase of said waiting time.

\* \* \* \* \*